United States Patent
Schirrmacher

(10) Patent No.: US 8,743,999 B2
(45) Date of Patent: Jun. 3, 2014

(54) DIGITAL SIGNAL PROCESSOR, COMMUNICATION DEVICE, COMMUNICATION SYSTEM AND METHOD FOR OPERATING A DIGITAL SIGNAL PROCESSOR

(75) Inventor: Martin Schirrmacher, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 147 days.

(21) Appl. No.: 13/073,502

(22) Filed: Mar. 28, 2011

(65) Prior Publication Data

US 2011/0228874 A1 Sep. 22, 2011

Related U.S. Application Data

(63) Continuation of application No. PCT/EP2009/062692, filed on Sep. 30, 2009.

(60) Provisional application No. 61/101,776, filed on Oct. 1, 2008, provisional application No. 61/101,836, filed on Oct. 1, 2008.

(30) Foreign Application Priority Data

| Oct. 1, 2008 | (DE) | 10 2008 042 545 |
| Oct. 1, 2008 | (DE) | 10 2008 042 547 |

(51) Int. Cl.
*H04L 27/00* (2006.01)

(52) U.S. Cl.
USPC .......................................... 375/295; 375/265

(58) Field of Classification Search
USPC .......................................... 375/265, 295, 299
See application file for complete search history.

(56) References Cited

U.S. PATENT DOCUMENTS

| 5,282,226 | A | * | 1/1994 | Critchlow | 375/295 |
| 5,659,569 | A | * | 8/1997 | Padovani et al. | 370/479 |
| 5,684,922 | A | * | 11/1997 | Miyakawa et al. | 704/229 |
| 5,706,354 | A | * | 1/1998 | Stroehlein | 381/94.1 |
| 6,473,731 | B2 | * | 10/2002 | Hinderks | 704/200.1 |
| 6,813,477 | B1 | | 11/2004 | Harris et al. | |
| 7,158,564 | B1 | | 1/2007 | Kernchen et al. | |
| 7,808,251 | B2 | | 10/2010 | Krueger et al. | |

(Continued)

FOREIGN PATENT DOCUMENTS

| DE | 19957093 A1 | 5/2001 |
| DE | 102004049895 A1 | 4/2006 |
| DE | 102005032141 A1 | 1/2007 |
| RU | 2282941 | 8/2006 |
| WO | WO 2007/073268 A1 | 6/2007 |

OTHER PUBLICATIONS

First German Office Action for DE 10 2008 042 545.1 dated Sep. 18, 2009.

(Continued)

*Primary Examiner* — Emmanuel Bayard
(74) *Attorney, Agent, or Firm* — Jenkins, Wilson, Taylor & Hunt, P.A.

(57) ABSTRACT

The present invention provides a digital signal processor, a communication system comprising such a digital signal processor and a method for operating such a digital signal processor. The digital signal processor for a communication system in an aircraft cabin of an aircraft comprises a provision means for providing a predeterminable digital signal suitable for forming a respective wave form for mapping a respective pre-determined service signal and a pre-determined noise signal.

7 Claims, 4 Drawing Sheets

(56) References Cited

U.S. PATENT DOCUMENTS

| | | | |
|---|---|---|---|
| 2005/0058021 A1* | 3/2005 | Feintuch et al. | 367/99 |
| 2005/0250452 A1* | 11/2005 | Walton et al. | 455/63.4 |
| 2007/0019282 A1* | 1/2007 | Weiner et al. | 359/326 |
| 2008/0227441 A1 | 9/2008 | Hermel et al. | |
| 2008/0306733 A1* | 12/2008 | Ozawa | 704/226 |
| 2009/0074106 A1* | 3/2009 | See et al. | 375/297 |
| 2010/0020757 A1* | 1/2010 | Walton et al. | 370/329 |
| 2010/0142645 A1* | 6/2010 | Murakami et al. | 375/302 |

OTHER PUBLICATIONS

First German Office Action for DE 10 2008 042 547.8 dated Sep. 18, 2009.
Second German Office Action for DE 10 2008 042 545.1 dated Sep. 3, 2010.
Second German Office Action for DE 10 2008 042 547.8 dated Sep. 3, 2010.
International Search Report and Written Opinion for PCT/EP2009/062692 dated Jun. 24, 2010.
Pucker, Lee: "SDR Architecture", URL: http://www.mmitsforum.org/pages/aboutSdrTech/SDR_Architectures.pdf (at least as early as Sep. 18, 2009).
Base Station System Structure, Document No. SDRF-01-P-0006-V2.0.0, Jan. 15, 2002, URL: http://www.sdrforum.org/pages/documentLibrary/documents/SDRF-01-P-0006-V2_0_0 BaseStation_Systems.pdf.
Russian Office Action for Application No. 2011110527/07 dated Aug. 9, 2013.

* cited by examiner

DIGITAL SIGNAL PROCESSOR, COMMUNICATION DEVICE, COMMUNICATION SYSTEM AND METHOD FOR OPERATING A DIGITAL SIGNAL PROCESSOR

CROSS-REFERENCE TO RELATED APPLICATIONS

This application is a continuation of PCT/EP2009/062692 filed Sep. 30, 2009 which claims the benefit of and priority to U.S. Provisional Application No. 61/101,776 filed Oct. 1, 2008, U.S. Provisional Application No. 61/101,836 filed Oct. 1, 2008, German Patent Application No. 10 2008 042 545.1 filed Oct. 1, 2008 and German Patent Application No. 10 2008 042 547.8 filed Oct. 1, 2008, the entire disclosures of which are herein incorporated by reference.

FIELD OF THE INVENTION

The present invention relates to a digital signal processor, to a communication apparatus, to a communication system having a digital signal processor such as this, and to a method for operation of a digital signal processor such as this.

Although it can be used in any desired areas, the present invention will be explained in more detail with reference to an aircraft, or to a passenger aircraft.

The technical field of the invention relates to communication systems in aircraft cabins. Communication systems such as these provide communication services or services such as GSM, UMTS, WLAN or the like for a crew of the aircraft or for passengers.

A leaky line antenna can be used to emit the respective service signal for the corresponding service, and is arranged along the length of the aircraft cabin. In order to check the correct installation and operation of the communication system, in particular in order to ensure the high-frequency (HF) signal distribution within the aircraft cabin, a coverage measurement (radio supply measurement) is carried out in each frequency band of the corresponding services, by means of an HF spectrum analyser and a measurement antenna, at a plurality of different locations in the aircraft cabin. In this case, the measurement results may vary widely depending on the state and configuration of the aircraft cabin and the choice of the measurement point. For this reason, the measurement results must be averaged in a suitable manner, and must be corrected by means of the respective antenna factors for the measurement antennas being used.

A measurement which is carried out inaccurately or incorrectly can in some circumstances lead to predetermined, in particular official, limit values being undershot, even though the official limit values are actually overshot. Furthermore, it is possible for a fault message to be triggered even though no fault is actually present.

In the case of a conventional measurement by means of an HF spectrum analyser and a self-provided measurement antenna, the respective measurements disadvantageously have to be carried out manually and therefore take a long time and have a high cost. Furthermore, self-trained personnel are disadvantageously required in order to carry out and evaluate the conventional measurements. These trained personnel must, in particular, have experience with HF measurements. Furthermore, the conventional measurements require special hardware, for example the HF spectrum analyser and the measurement antenna.

In order to allow the test to be carried out at any desired point in the aircraft cabin, HF test signals are conventionally used which are at power levels which require official licensing. This official licensing is conventionally necessary since the conventional HF test signals at the power levels that are used can also still be measured outside the aircraft, and can potentially cause interference with other services.

In order to solve these problems, the applicant is internally aware of an apparatus which includes a functional test of the communication system being carried out automatically by means of an HF signal.

This internally known apparatus has a transmission path which has at least one leaky line antenna arranged in the aircraft cabin. Furthermore, this apparatus has a control apparatus, which is coupled to the transmission path. The control apparatus has a generation device, for generation of a broadband noise signal, and a plurality of transmitting/receiving devices. Each transmitting/receiving device is suitable for provision of a respective, fixedly defined service signal for provision of a predetermined service, and for transmission via the transmission path. By way of example, the apparatus contains five dedicated transmitting/receiving devices for provision of a GSM service, a CDMA service, an IMT service, a UMTS service and a WLAN service.

Furthermore, a combining device is provided, which is set up to combine the broadband noise signal provided and the service signals in order to form an HF signal which can be fed into the transmission path.

Furthermore, a transmission device is provided in order to feed the HF signal provided by the combining device into the leaky line antenna, in order to carry out the functional test on the communication system.

Overall the apparatus which is known internally by the applicant requires a total of at least three dedicated apparatuses in order to provide the HF signal with the noise signal and the at least one service signal, specifically the generation device for generation of the noise signal, at least one transmitting/receiving device for generation of the at least one service signal, and the combining device for combination of the noise and service signals.

Disadvantageously, the at least three dedicated apparatuses cost space and weight. Particularly in aircraft, an increased space and weight requirement involves considerable cost disadvantages.

SUMMARY OF THE INVENTION

One object of the present invention is accordingly to provide a space-optimised and weight-optimised solution for provision of the HF signal for the communication system in the aircraft.

A digital signal processor is accordingly suitable for a communication system in an aircraft cabin in an aircraft, with the digital signal processor having a provision means for provision of a predeterminable digital signal, which is suitable for formation of a respective waveform for mapping a respective predetermined service signal and a predetermined noise signal.

Furthermore, a communication system is proposed, which has:
 at least one digital signal processor, as explained above, for provision of a respective digital signal; and
 a transmission path which has at least one leaky line antenna, which is arranged in the aircraft cabin, for transmission of the respective digital signal into the aircraft cabin.

A method of operating a digital signal processor for a communication system in an aircraft cabin of an aircraft is furthermore proposed, in which the digital signal processor is set up such that it is suitable for provision of a predetermined digital signal, which is suitable for formation of a respective waveform for mapping a respective predetermined service signal and a respective predetermined masking signal.

Furthermore, a communication apparatus for a communication system in an aircraft cabin of an aircraft is proposed, comprising:

a plurality N of digital signal processors, as described above, the respective digital signal processor being set up to provide a predeterminable digital signal, which is suitable for forming a respective waveform in a base band range for mapping at least one respective service signal and at least one respective noise signal;

a plurality M of front-end modules, the respective front-end module being set up at least to mix the respective waveform for forming an HF signal into a predetermined high frequency range; and a controllable switching device which switches at least one digital signal processor to at least one front-end module as a function of at least one control signal.

One advantage of the present invention is that a digital signal processor (DSP) can be used to provide not only a respective predetermined service signal for a predetermined service, but also a predetermined noise signal or masking signal for masking at least one respective base station signal from a base station.

Space and therefore costs are saved according to the invention by the integration of the generation of the noise signal in the digital signal processor.

Furthermore, according to the invention, the respective service signal can be predetermined and can therefore be adjusted as a function of a programmable preset. It is therefore possible to offer a first service, for example GSM, at a first time, and a second service, for example IMT, at a second time, by means of a single digital signal processor.

Advantageous refinements and improvements of the invention can be found in the dependent claims.

According to one preferred refinement of the digital signal processor according to the invention, the provision means is set up to form the respective digital signal such that this is suitable for forming a respective waveform with a predeterminable bandwidth and with a predeterminable signal-to-noise ratio for mapping the respective predetermined service signal and the respective predetermined noise signal.

According to a further preferred refinement, the provided broadband noise signal contains at least one masking signal, with the respective masking signal being suitable in particular for masking a respective terrestrial base station signal which uses a respective predetermined frequency band.

According to a further preferred refinement, the respective service signal is suitable for provision of a predetermined service, such as GSM, UMTS or WLAN.

According to one preferred refinement of the communication system according to the invention, a software-defined radio device is provided, and comprises the number of digital signal processors.

According to a further preferred refinement of the communication system, the communication system furthermore has:

the transmission path, which has at least the leaky line antenna which is arranged in the aircraft cabin;

the software-defined radio device, which is coupled to the transmission path and has the digital signal processors and a transmission device for feeding the HF signal into the leaky line antenna, with the HF signal which is fed in being at a predetermined power level;

at least one measurement device, which is coupled to the transmission path at a predetermined coupling point, for measurement of the power level of the HF signal at the coupling point and for provision of a measurement signal which is proportional to the measured power level; and an evaluation means for provision of a test result by means of a comparison between the measurement signal that is provided and a nominal signal which is dependent on the power level of the HF signal that is fed in.

According to a further preferred refinement, the noise signal which is provided has a bandwidth which is wider than a coherence bandwidth of the transmission path.

According to a further preferred refinement, the transmission path has a transmitting leaky line antenna which is arranged along the length of the aircraft cabin and a receiving leaky line antenna which is arranged along the length of the aircraft cabin.

By way of example, the transmitting leaky line antenna and the receiving leaky line antenna are arranged parallel in the aircraft cabin, and are each coupled between the first end and the second end of the transmission path.

According to a further preferred development, a plurality of measurement devices are provided, with a first measurement device being coupled to the transmitting leaky line antenna at the second end of the transmission path, and with a second measurement device being coupled to the receiving leaky line antenna at the first end of the transmission path.

Furthermore, a computer program product is proposed, which causes a method as described above according to the invention to be carried out on a program-controlled device.

A computer program product such as a computer program means may, for example, be provided or supplied as a storage medium, such as a memory card, USB stick, floppy disk, CD-ROM, DVD or else in the form of a downloadable file from a server in a network. This can be done in a wireless communication network, for example, by transmission of an appropriate file with the computer program product or the computer program means.

The invention will be explained in more detail in the following text with reference is to exemplary embodiments, and with reference to the attached figures, in which:

DESCRIPTION OF EXEMPLARY EMBODIMENTS

In the figures, the same reference symbols denote like or functionally equivalent components, unless stated to the contrary.

Figure 1:
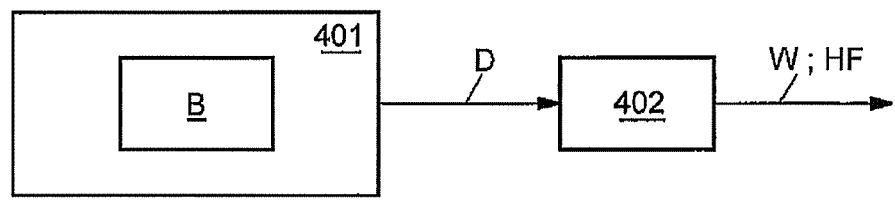
FIG. 1 shows a schematic block diagram of one exemplary embodiment of the digital signal processor according to the invention.

FIG. 1 shows a schematic block diagram of one exemplary embodiment of the digital signal processor 401 according to the invention.

The digital signal processor 401 has a provision means B for provision of a predeterminable digital signal D. The respective predeterminable digital signal D is suitable for forming a respective waveform W for mapping a respective predetermined service signal D1 and a predetermined noise signal R. The respective waveform W forms a high-frequency signal HF. A digital/analogue converter 402 is provided to convert the digital signal D to the respective waveform W. The digital signal processor 401 and the digital/analogue converter 402 form, in particular, a communication apparatus 400.

The provision means B is preferably set up to form the respective digital signal D such that it is suitable for forming a respective waveform W with a predeterminable bandwidth and with a predetermined signal-to-noise ratio, for mapping the respective predetermined service signal D1 and the respective predetermined noise signal R.

The respective service signal D1 is preferably suitable for provision of a predeterminable service, such as GSM, UMTS or WLAN.

The broadband noise signal R which is provided preferably contains at least one masking signal M1-M3, with the respective masking signal M1-M3 being suitable for masking a respective terrestrial base station signal B1-B3. The respective terrestrial base station signal B1-B3 preferably uses a respective predetermined frequency band F1-F3.

The provision means B is implemented, in particular, in the form of software in the digital signal processor 401.

In this case, the provision means B may be in the form of a computer program product, a function, a routine, part of a program code, or an executable object.

Figure 2:
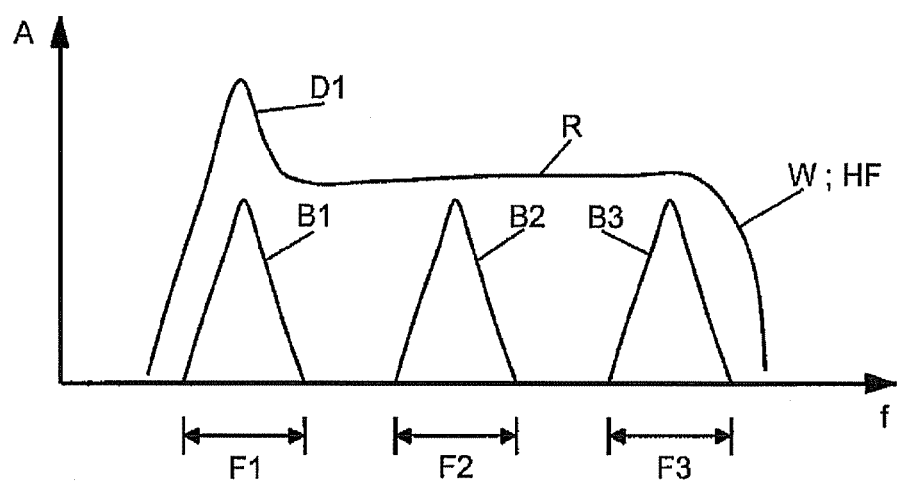
FIG. 2 shows a schematic amplitude-frequency diagram with one exemplary embodiment of the waveform according to the invention and three terrestrial base station signals.

In this context, FIG. 2 shows a schematic amplitude-frequency diagram with one exemplary embodiment of the waveform W and of the HF signal HF according to the invention, and the three terrestrial base station signals B1-B3. According to FIG. 2, the HF signal HF comprises the noise signal R and the service signal D1 superimposed on it.

Figure 3:
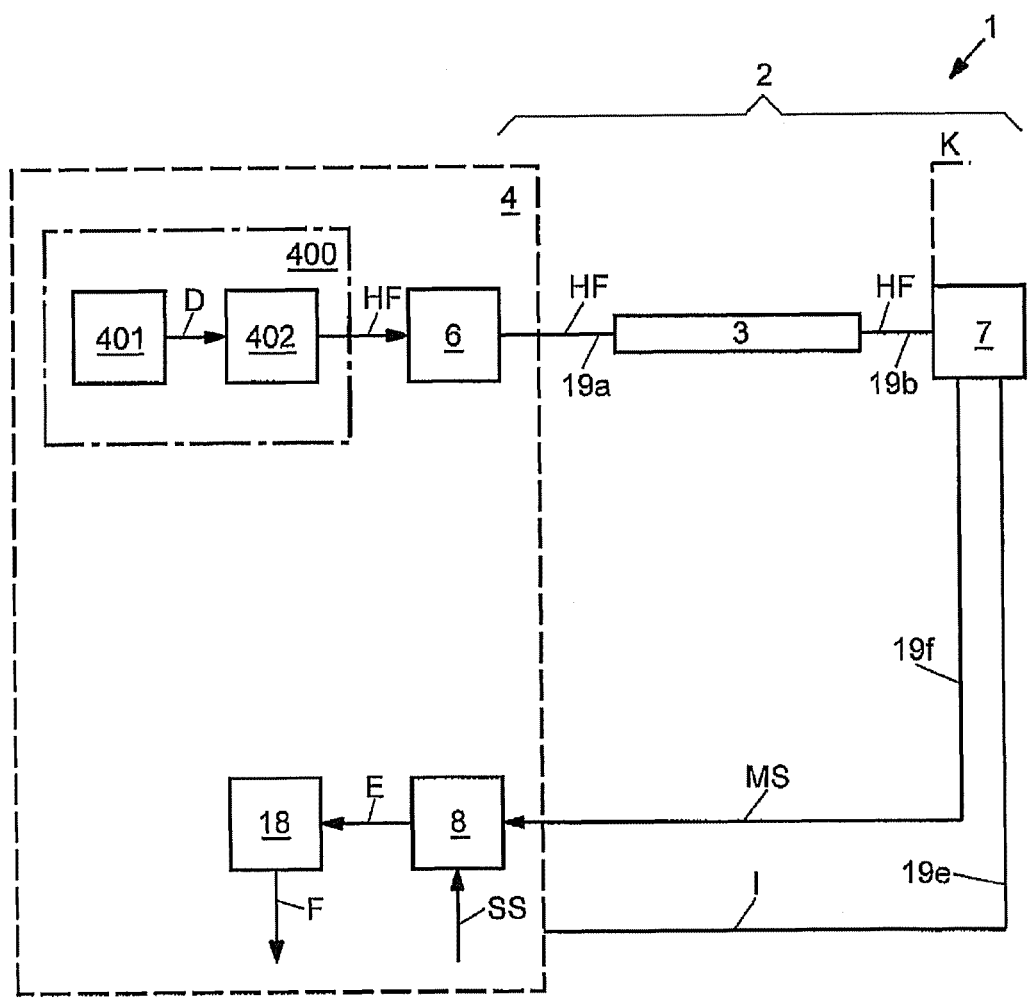
FIG. 3 shows a schematic block diagram of one exemplary embodiment of the communication system according to the invention.

FIG. 3 shows a schematic block diagram of one exemplary embodiment of the communication system 1 according to the invention. The communication system 1 has a transmission path 2, a control apparatus 4 which is coupled to the transmission path 2, at least one measurement device 7, which is coupled to the transmission path 2 at a predetermined coupling point K, and an evaluation means 8.

The transmission path 2 has at least one leaky line antenna 3 which is arranged in the aircraft cabin. The leaky line antenna 3 is, for example, in the form of a coaxial line with a plurality of perforations.

By way of example, the control apparatus 4 is coupled by means of a line 19a to the leaky line antenna 3. Furthermore, the control apparatus 4 has a software-defined radio device 400.

The software-defined radio device 400 has a number of digital signal processors 401 for provision of a respective digital signal D. Furthermore, the control apparatus 4 has a transmission device 6 for feeding the HF signal HF into the leaky line antenna 3, with the HF signal HF which is fed in being at a predetermined power level. A digital/analogue converter (DAC) is connected between the transmission device 6 and each digital signal processor 401. Each digital/analogue converter (DAC) converts the respective digital signal D to the respective waveform W which forms the respective HF signal HF. Without loss of generality, FIG. 3 shows only one digital signal processor 401.

The noise signal R which is provided has a bandwidth which is wider than a coherence bandwidth of the transmission path 2. Furthermore, the broadband noise signal R which is provided preferably contains at least one masking signal M1-M3. Each masking signal M1-M3 is suitable for masking a respective terrestrial base station B1-B3, which uses a respective predetermined frequency band F1-F3 (cf. FIG. 2).

The measurement device 7 is suitable for measuring the power level of the HF signal HF at the predetermined coupling point K, in order to provide a measurement signal MS which is proportional to the measured power level. By way of example, the measurement device 7 is coupled by means of a line 19b to the leaky line antenna 3. Furthermore, the measurement device 7 is supplied with current I from the control apparatus 4 by means of a line 19e. In addition, the measurement device 7 transmits the measurement signal MS by means of a line 19f to the evaluation means 8.

The measurement device 7 has an HF termination. By way of example, the measurement device 7 has a terminating resistor 9 for HF termination. Alternatively, the measurement device 7 may be coupled to a terminating resistor 9. The measurement signal MS is, for example, in the form of a direct voltage signal, a current signal or a frequency signal. By way of example, the measurement device 7 may be in the form of a HF detector which is set up to convert the power level of the HF signal HF at the coupling point K to a proportional direct voltage signal.

The evaluation means 8 is set up to provide a test result E by comparing the measurement signal MS which is provided and a nominal signal SS which is dependent on the power level of the HF signal HF which is fed in.

Furthermore, the control apparatus preferably has a fault detection means 18. The fault detection means 18 is set up to detect a fault F on the transmission path 2 as a function of the test result E provided by the evaluation means 8.

Figure 4:
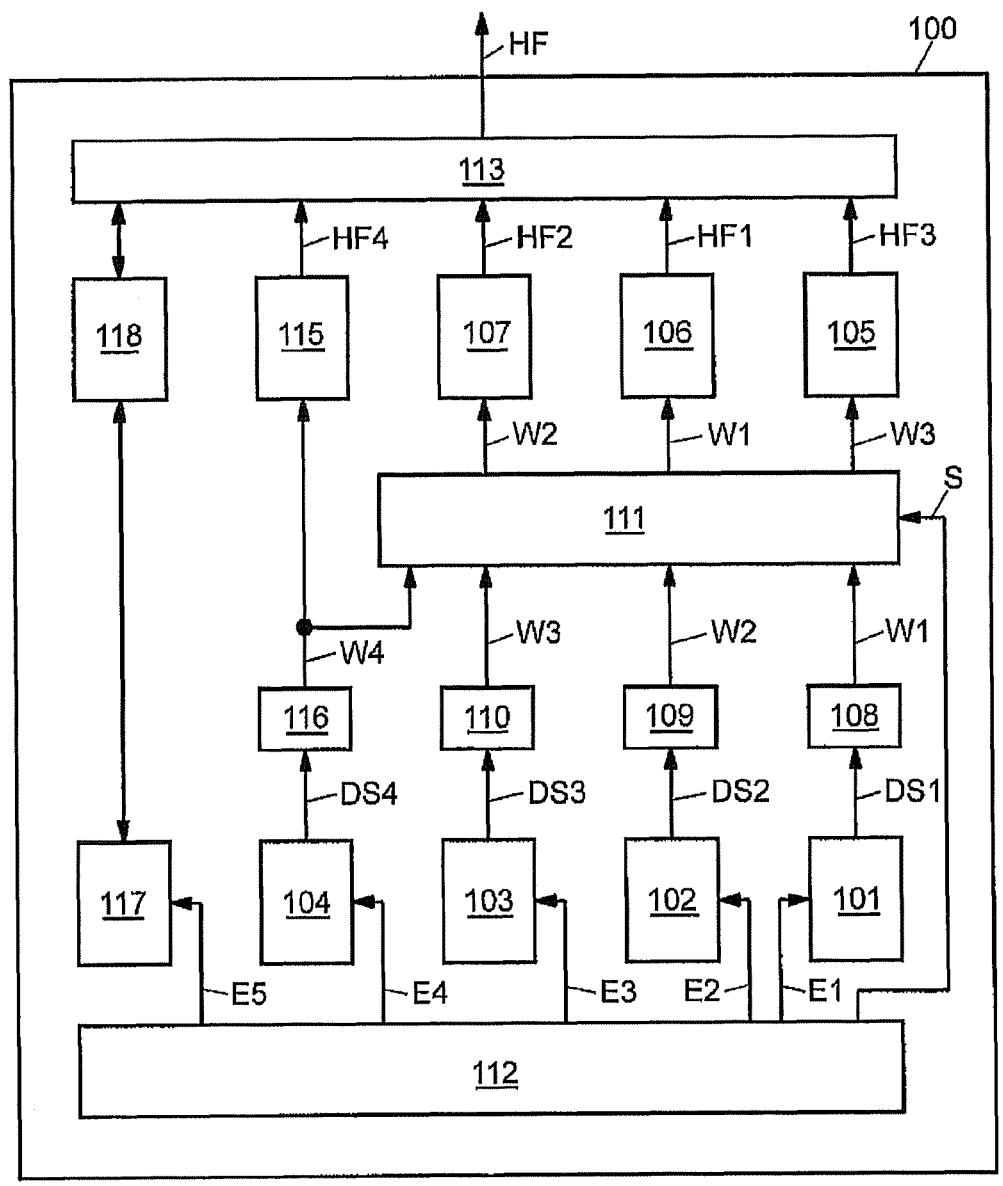
FIG. 4 shows a schematic block diagram of one exemplary embodiment of the communiation apparatus according to the invention.

The software-defined radio device 400 according to FIG. 3 is preferably in the form of a communication apparatus 100 according to FIG. 4. In this way, the communication apparatus 100 according to FIG. 4 can replace the software-defined radio device 400 in FIG. 3.

In this regard, FIG. 4 shows a schematic block diagram of an exemplary embodiment of the communication apparatus 100 according to the invention.

The communication apparatus 100 according to FIG. 4 has a plurality N of digital signal processors 101-104, a plurality M of front-end modules 105-107 and a controllable switching device 111. Without loss of generality, the number N of digital signal processors in FIG. 4 is 4 and the number M of front-end modules is 5.

Each digital signal processor 101-104 is set up to provide a predeterminable digital signal DS1-DS3. Each digital signal DS1-DS3 is set up to form a respective waveform W1-W3 in a base band range for forming at least one respective service signal D1-D3 and/or at least one respective noise signal R. A digital/analogue converter 108-110 is provided for converting the respective digital signal DS1-DS3 to the analogue waveform W1-W3.

The controllable switching device 111 is set up to switch at least one digital signal processor 101-104 to at least one front-end module 105-107 as a function of at least one control signal S.

In the exemplary embodiment according to FIG. 4, the switching device 111 switches the first digital signal processor 101 to the second front-end module 106, the second digital signal processor 102 to the third front-end module 107 and the third digital signal processor 103 to the first front-end module 105.

Each front-end module 105-107 is set up to mix the respective waveform W1-W3 for forming the HF signal HF into a predetermined high-frequency range. In this context, the respective front-end module 105-107 is set up in particular to receive the waveform W1-W3 transmitted by the respective digital signal processor 101-103 in the base band range and mix it in the respective predetermined high-frequency range. Furthermore, the respective digital signal processor 101-104 is set up to generate the respective waveform W1-W3 in the base band range for the provision of at least one predetermined service and/or for the provision of at least one predetermined masking and to transmit said waveform to the respective switched front-end module 105-107.

Furthermore, the communication apparatus 100 preferably has a control apparatus 112 which controls the switching device 111 by means of the at least one control signal S. For example, the control apparatus 112 is set up to switch at least two digital signal processors S to a single predetermined front-end module 105-107.

The control apparatus 112 may also be set up to switch the N digital signal processors 101-104 to the M front-end modules 105-107 by means of the at least one control signal. For example, the control apparatus 112 generates N control signals for this purpose.

The M front-end modules 105-107 are preferably set up such that the respective predetermined high-frequency range of the respective front-end module 105-107 corresponds to a frequency range of the predetermined services.

The control apparatus 112 can then preferably also be set up to monitor the respective radio traffic in the respective frequency range of the respective predetermined service within the aircraft cabin and to generate the N control signals S in the frequency range of at least one predetermined service as a function of the monitoring of the radio traffic.

Furthermore, the control apparatus 112 may be set up to generate a respective adjustment signal E1-E3 for the respective digital signal processor 101-103 as a function of the monitoring of the radio traffic in the frequency range of the respective service and to adjust a power of the respective digital signal processor 101-103 by means of the generated adjustment signal E1-E3. For example, the control apparatus 112 may be set up such that a number of information channels of the respective digital signal processor 101-103 and/or a clock rate of the respective digital signal processor 101-103 are adjusted by means of the respective adjustment signal E1-E3.

The communication apparatus 100 is preferably in the form of a software-defined radio device. Furthermore, the software-defined radio device 100 preferably comprises a combining device 113 which is set up to combine the waveforms W1-W3 provided by the front-end modules 105-107 in the high-frequency range to form the HF signal.

Furthermore, the communication apparatus 100 preferably comprises a further DSP 104 and a front-end module 115 which is coupled to the DSP 104 for providing a noise signal or masking signal HF4 in a predetermined frequency range, for example 450-900 MHz. Furthermore, the further DSP 104 can also be coupled to the switching device 111. In particular, the further DSP 104 and the further front-end module 115 are suitable for generating a specific noise floor as a function of the absolute location of the aircraft.

Figure 5:
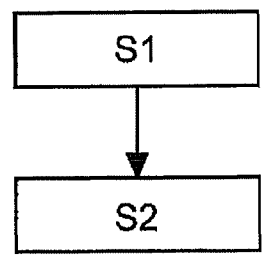
FIG. 5 shows a schematic flowchart of one exemplary embodiment of a method for operation of a digital signal processor for a communication system in an aircraft cabin of an aircraft.

FIG. 5 shows a schematic flowchart of an exemplary embodiment of a method for operating a digital signal processor 401 for a communication system 1 in an aircraft cabin of an aircraft.

The method according to the invention will be described in the following with reference to the block diagram in FIG. 5 and with reference to the block diagrams of FIGS. 1 to 4. The method of the invention according to FIG. 5 comprises method steps S1 to S2:

Method Step S1:
A digital signal processor 401 is provided for a communication system 1 in an aircraft cabin of an aircraft.

Method Step S2:
The digital signal processor 401 is set up so as to be suitable for providing a predetermined digital signal D which is suitable for forming a respective waveform W for mapping a respective predetermined service signal D1 and a respective predetermined noise signal R.

Although the present invention has been described with reference to preferred exemplary embodiments, it is not limited thereto but can be modified in a variety of ways.

LIST OF REFERENCE NUMERALS 1 communication system
2 transmission path
3 leaky line antenna
4 control apparatus
6 transmission device
7 measurement device
8 evaluation means
9 terminating resistor
14 selection means
15 trigger means
18 fault detection means
19a-19e line
A power level
D1 service signal
E test result, test result vector
F fault
F1-F3 frequency band
HF signal
I current
MS measurement signal
R noise signal
SS nominal signal
S1, S2 method step

The invention claimed is:

1. A digital signal processor for a communication system in an aircraft cabin of an aircraft, characterised in that the digital signal processor is configured to provide a predeterminable digital signal which is suitable for formation of a respective waveform for mapping a respective predetermined service signal and a predetermined noise signal comprised in a high-frequency signal; and
wherein the digital signal processor is configured to form the respective digital signal such that it is suitable for forming a respective waveform with a predeterminable bandwidth and with a predeterminable signal-to-noise ratio for masking the respective predetermined service signal and the respective predetermined noise signal comprised in the high-frequency signal.

2. The digital signal processor according to either claim 1, wherein a provided broadband signal contains at least one masking signal, with the respective masking signal being suitable for masking a respective terrestrial base station signal which uses a respective predetermined frequency band.

3. The digital signal processor according to claim 1, wherein the respective service signal is suitable for provision of a predetermined service, such as GSM, UMTS or WLAN.

4. A communication system having:
a number of digital signal processors for provision of a respective digital signal according to claim 1; and a transmission path which has at least one leaky line antenna, which is arranged in the aircraft cabin, for transmission of a respective waveform, which is formed as a function of the respective digital signal, into the aircraft cabin.

5. The communication system according to claim 4, wherein a software-defined radio device is provided, and comprises the number of digital signal processors.

6. A communication apparatus for a communication system in an aircraft cabin of an aircraft, having:
   a plurality N of digital signal processors according to claim 1, each digital signal processor being set up to provide a predeterminable digital signal which is suitable for forming a respective waveform in a base band range for mapping at least one respective service signal and at least one respective noise signal;
   a plurality M of front-end modules, each front-end module being set up at least to mix the respective waveform for forming an HF signal into a predetermined high-frequency range; and
   a controllable switching device which switches at least one digital signal processor to at least one front-end module as a function of at least one control signal.

7. A method for operation of a digital signal processor for a communication system in an aircraft cabin of an aircraft, characterised in that the digital signal processor is set up such that it is suitable for provision of a predetermined digital signal, which is suitable for forming a respective waveform for mapping a respective predetermined service signal and a respective predetermined noise signal comprised in a high-frequency signal,
   wherein the respective digital signal is formed such that it is suitable for forming a respective waveform with a predeterminable bandwidth and with a predeterminable signal-to-noise ratio for masking the respective predetermined service signal and the respective predetermined noise signal comprised in the high-frequency signal.

* * * * *